United States Patent [19]

Shealy

[11] 3,742,783
[45] July 3, 1973

[54] LIMITED-SLIP TYPE DIFFERENTIAL WITH ADJUSTING MEANS

[75] Inventor: Noah A. Shealy, Niles, Mich.

[73] Assignee: Clark Equipment Company, Buchanan, Mich.

[22] Filed: July 29, 1971

[21] Appl. No.: 167,316

[52] U.S. Cl.............................. 74/710.5, 192/111 A
[51] Int. Cl......................... F16h 1/44, F16d 11/00
[58] Field of Search .......................... 74/710–715; 192/111 A, 111 B

[56] References Cited
UNITED STATES PATENTS

| 3,344,688 | 10/1967 | Frost..................................... 74/711 |
| 3,264,901 | 8/1966 | Ferbitz et al......................... 74/711 |
| 3,110,364 | 11/1963 | Butler.......................... 192/111 A X |
| 3,276,290 | 10/1966 | Randall.................................. 74/711 |
| 3,330,169 | 7/1967 | Carrico et al......................... 74/711 |
| 3,378,109 | 4/1968 | Bauman...................... 192/111 A X |
| 3,390,593 | 7/1968 | Brownyer........................... 74/710.5 |
| 3,657,935 | 4/1972 | O'Brien................................ 74/711 |

Primary Examiner—Arthur T. McKeon
Attorney—Kenneth C. Witt, Robert J. Norton et al.

[57] ABSTRACT

A differential of the limited-slip type has adjusting means for reducing the space within which the differential's frictional clutches are confined so that as the interleaved friction discs wear during service the width of this confining space may be adjustably reduced to maintain the side gears in proper position throughout the differential's life.

14 Claims, 3 Drawing Figures

INVENTOR
NOAH A. SHEALY

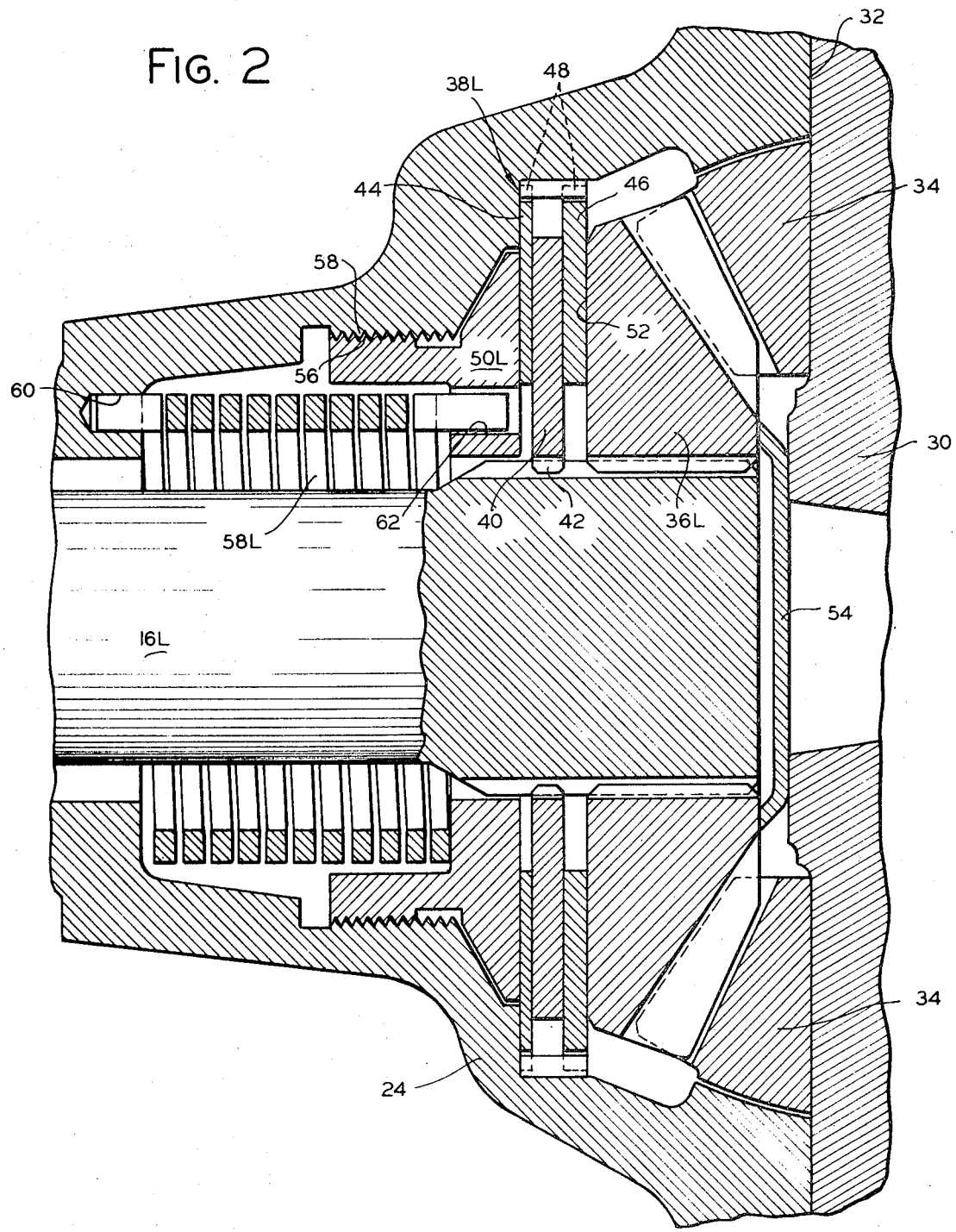

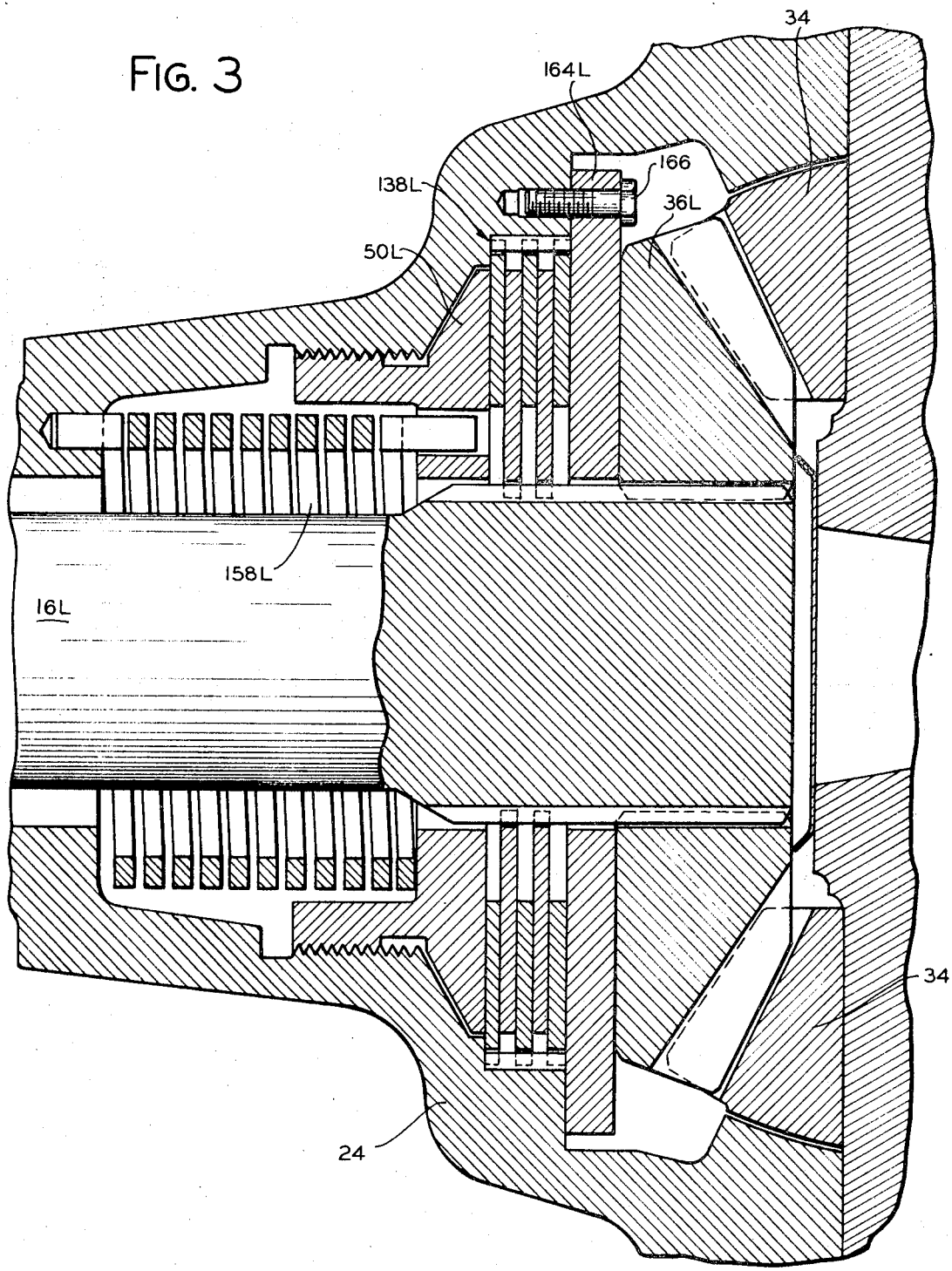

LIMITED-SLIP TYPE DIFFERENTIAL WITH ADJUSTING MEANS

BACKGROUND OF THE INVENTION

This invention relates to differential mechanisms of the "limited-slip" type wherein clutches having interleaved friction discs alternately connected to the differential's carrier and its axle driving side gears are provided within the carrier for the transmission of some torque through the clutches to one drive axle even if the other axle is permitted to turn freely. Commonly, such clutches are confined between the differential's side gears and an inner flange or wall of the carrier so that the axially outward thrust of the side gears under load may be utilized in compressing the friction discs for the transmission of torque. Because it is desirable to maintain the gear teeth of the side gears in proper mesh with the gear teeth of the differential's planetary pinion gears and since the axial location of each side gear is usually set by the gear's abutment on one side thereof with its associated clutch, the thickness of the interleaved friction disc must usually be accurately established prior to the differential's assembly. Further, because the friction discs wear and become progressively thinner during service, the side gears are permitted to move outwardly from proper mesh with the pinion gears as the differential ages. In order to counter this undesirable feature and extend the differentials's useful life the interleaved friction discs are often formed from a material having a surface hardness greater than that of normal clutch plate material.

One object of the present invention is to provide a limited-slip type differential having means for adjustably reducing the space within which the differential'clutch packs are confined so that the side gears may be maintained in proper mesh with the planetary gears as the clutch discs wear to thereby extend the differential's useful life, and further so that the clutch disc may be formed from common clutch plate materials whose thickness tolerances are more easily met.

SUMMARY OF THE INVENTION

In carrying out my invention in one preferred embodiment thereof, I provide a differential carrier rotatable about an axis of rotation which has a cross disposed diametrically therein. The cross carries a planetary gear, and a side gear is disposed within the carrier to mesh with the planetary gear and rotate about the carrier's axis of rotation. A backing member is connected to the carrier and a clutch pack which has a friction disc connected to the carrier and a friction disc connected to the side gear is interposed between the backing member and the side gear for the transmission of torque to the side gear. Adjusting means are provided for moving the backing member toward the side gear to maintain the friction discs in frictional engagement and to also maintain a proper mesh between the teeth of the side gear and the planetary gear, and this adjusting means allowing the backing member to move only in a direction toward the side gear.

BRIEF DESCRIPTION OF THE DRAWING

FIG. 2 is an enlarged view of a portion of the differential shown in FIG. 1, and FIG. 3, is an enlarged view of a portion of a differential similar to that shown in FIGS. 1 and 2 but illustrating a second embodiment in accordance with this invention.

DESCRIPTION OF PREFERRED EMBODIMENT

Figure 1:
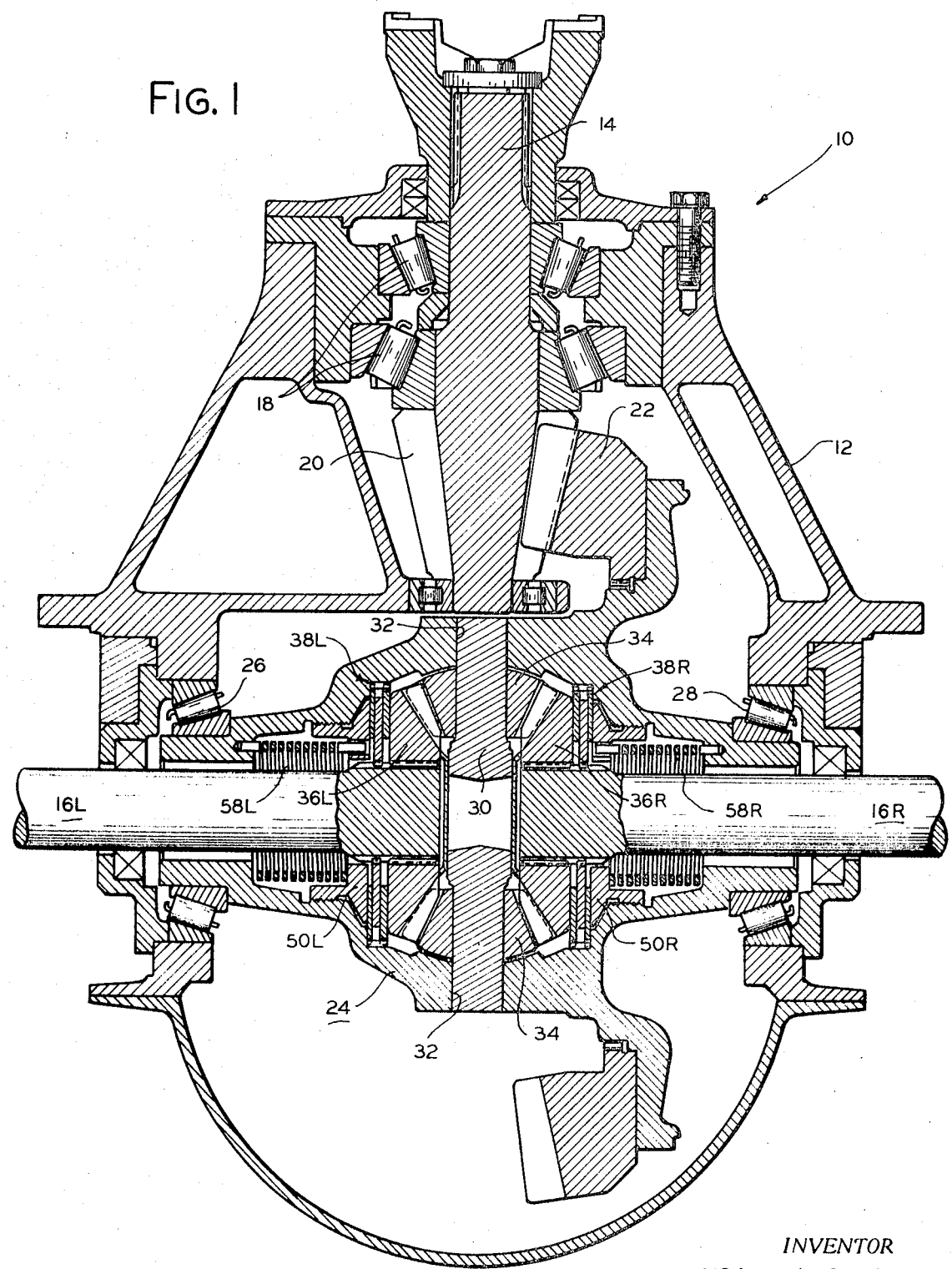
FIG. 1 illustrates a differential mechanism in accordance with an embodiment of this invention.

Referring to FIG. 1, a differential mechanism embodying this invention is indicated generally by the numeral 10. A housing 12 contains the various components of the differential and provides openings for an input shaft 14 and a pair of coaxial drive axles 16L and 16R. Input shaft 14 is rotatably journaled within housing 12 upon a pair of thrust bearings 18, and a drive pinion 20 is splined for conjoint rotation with the input shaft. A ring gear 22 is driven by drive pinion 20 and is connected to rotate a differential carrier 24 about its axis of rotation defined by tapered thrust bearings 26 and 28. Differential carrier 24 is hollow and carries a "spider" or "cross" 30 having multiple shafts each disposed diametrically across the inner cavity, the ends of the cross shafts being received within opposed bores 32 formed in carrier 24 to fix the cross for rotation with the carrier. Each shaft of cross 30 carries a pair of planetary pinion gears 34 journaled radially outward near the opposite ends of the shafts and these planetary gears each mesh with both a side gear 36L and a side gear 36R to complete the differential gear train. Drive axles 16 extend into differential carrier 24 coaxial with its axis of rotation and are splined to their respective side gears for driving conjoint rotation.

Differential carrier 24 includes means for resisting the free differential action of the mechanism to a limited extent so that some torque may be exerted by one drive axle even if the other axle is permitted to turn free, thereby providing what has come to be known as a "limited-slip" differential. This resisting means is provided by a clutch pack 38L associated with axle 16L and a similar clutch pack 38R associated with axle 16R, these clutch packs being explained in more detail hereafter. When axles 16L and 16R are operating at the same rotative speed there is no relative rotation between differential carrier 24 and either side gear 36; however, if one axle is permitted to turn more freely than the other then relative motion must occur between its respective side gear 36 and carrier 24 and this relative motion will be resisted by both clutch packs 38. The torque of this clutch pack resistance, in its equal but opposite reactive form, will be available to the axle 16L or 16R which is still capable of utilizing such torque.

Referring now to FIG. 2, clutch pack 38L is shown in more detail and it will be understood that this clutch pack and its associated components are allochiral duplicates of those associated with clutch pack 38R, shown on FIG. 1, so that the description hereinafter relative to clutch pack 38L is equally applicable to clutch pack 38R. Clutch pack 38 includes an annular friction disc 40 splined at 42 for conjoint rotation with axle 16 and interleaved between a pair of annular friction disc 44 and 46 splined at 48 for conjoint rotation with carrier 24. The clutch pack is confined between a backing member 50 and the outer planer surface, indicated at 52, of side gear 36 so that when planetary gear 34 is transmitting torque to side gear 36 the thrust of the side gear outwardly toward backing member 50 is utilized to compress clutch pack 38 for the frictional engagement of disc 40 between discs 44 and 46, thereby providing the "limited-slip" feature of differential 10. In order to prevent the "top-land" of the gear teeth of either side gear 36 or planetary gears 34 from bottoming upon the "bottom-land" of the respective opposite gear teeth, a spring washer 54 is provided between cross 30 and side gear 34 whose spring rate is sufficiently great that the washer operates primarily as a spacer in setting the normal working depth of engagement of the teeth of these gears. However, some resiliency is provided in spring washer 54 so that as the friction discs of clutch pack 38 expand due to frictional heating in use side gear 36 may move slightly away from backing member 50 to prevent undue wear of the friction discs.

Backing member 50 includes threads 56 along its shank which engage in mating threads 58 in carrier 24 so that the backing member may be threadably connected to the carrier as shown, and the pitch of these threads is relatively fine so that the axial reactive force of clutch pack 38 upon backing member 50 will not effect the turning or threading of the backing member into the differential carrier. As friction discs 40, 44, and 46 wear during service they gradually become thinner with the result that (were it not for the adjusting feature of backing member 50 hereinafter explained) side gears 36 may not be capable of compressing clutch packs 38 with sufficient force to effect the transmission therethrough of desirable torque between carrier 24 and axles 16 so that differential 10 must be "rebuilt" if its limited-slip characteristics are to be retained. Further, after prolonged service side gears 36 are permitted to move axially toward backing members 50 more than is desirable in respect to the proper mesh of the side gear's teeth with those of planetary gear 34, in which event the teeth of these gears may be permanently damaged due to excessive bending and compressive stresses.

In order to prolong the servicable life of differential 10 in this regard, means are provided for adjustably reducing the width of the confining space within which clutch pack 38 is contained without affecting the proper location of side gear 36 relative to planetary gears 34. Such adjusting means is provided, in this embodiment, by threaded backing member 50 as acted upon by a torsional spring 58 connected between carrier 24 and the backing member so that the spring torsionally biases the backing member in the direction to be threadably withdraw such member from the carrier axially toward clutch pack 38 and side gear 36. A bore 60 in carrier 24 engages one end of spring 58 therein to provide the spring's reaction point and the other end of spring 58 engages in a bore 62 in backing member 50 so that the potential torsional force of he spring may be exerted to threadably turn the backing member. The torsional spring rate of spring 58 is selected to be sufficiently high to turn backing member 50 so that it may adjustably "unscrew" with enough axial force to move friction disc 46 of clutch pack 38 into engagement with surface 52 of side gear 36 and also move the side gear into proper abutment with washer 54 whenever differential 10 is in a quiescent state. In this manner the width of the space confining clutch pack 38 may be adjustably reduced as the friction discs wear thinner during use and side gear 36 may be maintained in proper mesh with planetary gears 34 throughout the differential's life. Further, the bores 32 in carrier 24 which receive the ends of cross 30 may be of a shape or diameter selected to permit the cross to shift slightly along the carrier's axis of rotation and therefore the movement of one backing member 50 toward the other may reduce the width of the space confining clutch 38R as well as that confining clutch 38L. In this manner the adjustment features of one backing member 50L or 50R may be utilized to maintain the friction discs of both clutches 38L and 38R in proper frictional engagement and also maintain both side gears 36L and 36R in proper mesh with planetary pinion gears 34.

The embodiment of the present invention shown on FIGS. 1 and 2, and described above, is especially adapted to use in a differential mechanism preferably intended for use in heavy construction equipment. In such heavy equipment it is usually desirable to provide a limited-slip differential which permits the exertion of substantial torque by one drive axle even when the torque exerted by the other axle is relatively low, and to this end the clutch packs 38 were confined between backing member 50 and side gears 36 directly adjoining the surface 52 of the side gears so that the axially outward thrust of the side gears during operation is utilized in compressing the clutch packs. Referring now to FIG. 3, the pertinent portion of a differential embodying the present invention is shown which is adapted for use in lighter "automotive" applications, such as over-the-highway type trucks and automobiles. In such applications it is generally desirable to provide a selected constant resistance to the free differential action of differential 10 and it is not normally necessary that such resistance be as great as that provided by the embodiment shown in FIG. 2. The embodiment shown in FIG. 3 is similar to that shown in FIG. 2 and previously discussed excepting that clutch packs 138 are composed of a larger number of thinner interleaved friction discs and annular rings 164L and 164R are interposed between side gears 36 and clutch packs 138L and 138R respectively. Each ring 164 is connected to differential carrier 24, as by bolts 166, and is of sufficient strength to withstand, without undue deflection, the axially outward thrust of side gears 36 during the differential's operation so that the side gears may be accurately positioned and maintained in proper mesh with planetary gears 34. Ring 164 also provides a stop or foundation upon which clutch pack 138 may be compressed as backing member 50 unscrews toward ring 164 under the bias of torsional spring 158, and the torsional spring rate of this spring is selected to provide means for adjustably reducing the width of the confining space between the backing member and the stop-ring so that as the friction discs of clutch packs 138 wear they may be maintained in proper engagement by the axial movement of the backing member in the manner previously discussed. The spring 158 used in the embodiment of FIG. 3 is further selected to have a determined spring rate over its operating range so that it may exert a turning moment upon backing member 50 adapted to provide a constant axial force for the compression of clutch packs 138, thereby providing for the transmission of a constant maximum amount of torque between differential carrier 24 and axles 16 throughout the life of differential 10.

While I have described and illustrated herein preferred embodiments of my invention, it will be appreciated that modifications may be made therein. Therefore, it should be understood that I intend to cover by the appended claims all such modifications which fall within the spirit and scope of my invention.

I claim:

1. A differential carrier rotatable about an axis of rotation and comprising: a cross disposed within the carrier and connected for rotation with the carrier, a planetary gear carried by said cross, a backing member connected to the carrier, a side gear disposed within the carrier and rotatable about the carrier axis of rotation, said side gear being disposed between said backing member and said cross and the teeth of said side gear engaging in the teeth of said planetary gear, a clutch for transmitting torque between the carrier and said side gear, said clutch being disposed between said backing member and said side gear and including a friction disc connected to the carrier and a friction disc connected to said side gear, and adjusting means for moving said backing member toward said side gear with a force selected to maintain said friction discs in frictional engagement during all modes of operation to compensate for wear of said discs and to maintain said side gear in a preselected position relative to said planetary gear, said adjusting means permitting the movement of said backing member only in a direction toward said side gear.

2. A differential carrier as set forth in claim 1 wherein said backing member is threadably connected to the carrier and said adjusting means includes means for biasing said backing member to turn in a direction which causes said backing member to threadably withdraw from engagement with the carrier toward said side gear.

3. A differential carrier as set forth in claim 2 wherein said biasing means is a torsional spring connected between the carrier and said backing member.

4. A differential carrier as set forth in claim 1 and including a spring washer disposed between said cross and said side gear, the free height of said washer being selected to set the engagement of said side gear teeth and said planetary gear teeth at a predetermined working depth and the spring force of said washer being selected to be greater than the force exerted by said backing member toward said side gear.

5. A differential carrier as set forth in claim 4 wherein said backing member is threadably connected to the carrier and said adjusting means includes a torsional spring connected between the carrier and said backing member, said spring biasing said backing member to turn in a direction which causes said backing member to threadably withdraw from engagement with the carrier toward said side gear.

6. A differential carrier rotatable about an axis of rotation and comprising: a cross disposed within the carrier and connected for rotation with the carrier, said cross having first and second opposite sides facing along the carrier axis and also being movable a selected distance along said axis, a planetary gear carried by said cross, a first side gear disposed within the carrier on said first side of said cross and rotatable about the carrier axis of rotation, the gear teeth of said first gear engaging in the teeth of said planetary gear, a second side gear disposed within the carrier on said second side of said cross and rotatable about the carrier axis of rotation, the gear teeth of said second gear engaging in the teeth of said planetary gear, a first backing member connected to said carrier on said first side of said cross, a second backing member connected to said carrier on said second side of said cross, a first clutch for transmitting torque between the carrier and said first gear, said first clutch being disposed between said first gear and said first backing member and including a first driving friction disc connected to the carrier and a first driven friction disc connected to said first gear, a second clutch for transmitting torque between the carrier and said second gear, said second clutch being disposed between said second gear and said second backing member and including a second driving friction disc connected to the carrier and a second driven friction disc connected to said second gear, and first adjusting means for exerting a selected force to move said first backing member toward said second backing member to thereby reduce the distance between said first and second backing members to compensate for wear of said discs, said adjusting means maintaining said first and second driving discs in respective frictional engagement with said first and second driven discs during all modes of operation and also maintaining said first and second gears in a preselected position relative to said planetary gear to thereby maintain a selected engagement between the teeth of each said gear and the teeth of said planetary gear, said first adjusting means permitting the movement of said first backing member only in a direction toward said second backing member.

7. A differential carrier as set forth in claim 6 wherein said first backing member is threadably connected to the carrier and wherein said selected force exerted by said first adjusting means is supplied by a first torsional spring connected between the carrier and said first backing member, said first spring biasing said first backing member to turn in a direction which causes said first backing member to threadably withdraw from engagement with the carrier toward said second backing member.

8. A differential carrier as set forth in claim 6 and including second adjusting means for exerting a selected force to move said second backing member toward said first backing member to thereby reduce the distance between said second and first backing members to compensate for wear of said discs, said second adjusting means maintaining said first and second driving discs in respective frictional engagement with said first and second driven discs during all modes of operation and also maintaining said first and second gears in a preselected position relative to said planetary gear to thereby maintain a selected engagement between the teeth of each said gear and the teeth of said planetary gear, said second adjusting means permitting the movement of said second backing member only in a direction toward said first backing member.

9. A differential carrier as set forth in claim 8 wherein said first and second backing members are threadably connected to the carrier and wherein said selected force exerted by said first and second adjusting means is supplied by first and second torsional springs respectively connected between said first and second backing members and the carrier, said first and second springs separately and respectively biasing said backing members to turn in a direction which causes said backing members to threadably withdraw from engagement with the carrier.

10. A differential carrier as set forth in claim 9 and including a first spring washer disposed between said cross and said first gear and a second spring washer disposed between said cross and said second gear, the free height of each said washer being selected to set the engagement of the teeth of said respective gear and the teeth of said planetary gear at a predetermined working depth and the spring force of each said washer being selected to be greater than said selected force exerted by either said first adjusting means or said second adjusting means.

11. A differential carrier rotatable about an axis of rotation and comprising: a cross disposed within the carrier and connected for rotation with the carrier, a planetary gear carried by said cross, a backing member connected to the carrier, a side gear disposed within the carrier and rotatable about the carrier axis of rotation, said side gear being disposed between said backing member and said cross and the teeth of said side gear engaging in the teeth of said planetary gear, a stop ring connected to the carrier and disposed between said side gear and said backing member, said stop ring abutting said side gear and maintaining said side gear in a selected position relative to said planetary gear, a clutch for transmitting torque between the carrier and said side gear, said clutch being disposed between said backing member and said stop ring and including a friction disc connected to the carrier and the friction disc connected to said side gear, and adjusting means for moving said backing member toward said stop ring with a force selected to maintain a constant frictional engagement between said friction discs during all modes of operation of compensate for wear of said discs, said adjusting means permitting the movement of said backing member only in a direction toward said side gear.

12. A differential carrier as set forth in claim 11 wherein said backing member is threadably connected to said carrier and wherein said adjusting means includes means for biasing said backing member to turn in a direction to threadably withdraw from engagement with the carrier in a direction toward said stop ring.

13. A differential carrier as set forth in claim 12 wherein said biasing means is a torsional spring connected between the carrier and said backing member.

14. A differential carrier as set forth in claim 13 wherein said spring has a constant torsional spring rate.

* * * * *

UNITED STATES PATENT OFFICE
CERTIFICATE OF CORRECTION

Patent No. 3,742,783     Dated  3 July 1973

Inventor(s)  Noah A. Shealy

It is certified that error appears in the above-identified patent and that said Letters Patent are hereby corrected as shown below:

Column 5, lines 21 and 22, delete "and to maintain said side gear in a preselected position relative to said planetary gear".

Signed and sealed this 18th day of December 1973.

(SEAL)
Attest:

EDWARD M. FLETCHER, JR.
Attesting Officer

RENE D. TEGTMEYER
Acting Commissioner of Patents